(12) United States Patent
Locker et al.

(10) Patent No.: US 7,357,421 B2
(45) Date of Patent: Apr. 15, 2008

(54) PAGE OR BOOK FOR INTERACTING WITH AN ANIMAL

(76) Inventors: Sari Locker, P.O. Box 20258, New York, NY (US) 10021; Brian Clinton, P.O. Box 20258, New York, NY (US) 10021

( * ) Notice: Subject to any disclaimer, the term of this patent is extended or adjusted under 35 U.S.C. 154(b) by 0 days.

(21) Appl. No.: 11/223,002

(22) Filed: Sep. 9, 2005

(65) Prior Publication Data
US 2007/0085324 A1    Apr. 19, 2007

(51) Int. Cl.
*B42D 1/00* (2006.01)
(52) U.S. Cl. .................. 281/15.1; 281/21.1; 446/149; 434/317; 119/707
(58) Field of Classification Search ........... 281/21.1, 281/15.1, 22, 37, 38, 42; 446/149, 71, 72, 446/73, 75, 147; 434/317, 178; 426/87, 426/383; 119/707, 709, 710, 711
See application file for complete search history.

(56) References Cited

U.S. PATENT DOCUMENTS

| | | | |
|---|---|---|---|
| 2,548,043 A | | 4/1951 | Muhlhauser |
| 2,874,707 A | | 2/1959 | Koppel |
| 3,191,319 A | | 6/1965 | Waisgerber |
| 4,024,880 A | | 5/1977 | Newton et al. |
| 4,203,516 A | | 5/1980 | Stonoga et al. |
| 4,365,438 A | * | 12/1982 | Nelson ..................... 446/75 |
| 4,484,768 A | | 11/1984 | Norfleet |
| 4,702,700 A | | 10/1987 | Taylor |
| 4,752,230 A | | 6/1988 | Shimizu |
| 4,757,580 A | | 7/1988 | Wolf |
| 5,031,935 A | | 7/1991 | D'Andre |
| 5,049,078 A | | 9/1991 | Thomson |
| 5,167,508 A | * | 12/1992 | Mc Taggart ............. 434/317 |
| 5,419,705 A | * | 5/1995 | Sandvik .................. 434/317 |
| 5,443,036 A | | 8/1995 | Amiss et al. |
| 5,573,438 A | * | 11/1996 | D'Andrea ............... 446/149 |
| 5,640,931 A | | 6/1997 | Markham |
| 5,702,740 A | | 12/1997 | Wild |
| 5,895,305 A | | 4/1999 | Cowley et al. |
| 5,915,729 A | | 6/1999 | Vap |
| 5,938,242 A | | 8/1999 | Ryan |
| 6,041,215 A | * | 3/2000 | Maddrell et al. ......... 434/317 |
| 6,106,302 A | | 8/2000 | Schumacher |
| 6,129,053 A | | 10/2000 | Markham et al. |

(Continued)

OTHER PUBLICATIONS

Anne Bobby, "Love Me Or Leash Me" (web page).

(Continued)

*Primary Examiner*—Dana Ross
(74) *Attorney, Agent, or Firm*—Robert L. Shaver; Dykas, Shaver & Nipper, LLP

(57) ABSTRACT

A page or book for interacting with a non-human animal is provided. In various embodiments, a book is provided comprising a cover, a plurality of pages, at least one of the plurality of pages and/or cover having at least one element is provided that is attractive to the animal's sense of sight, smell, taste, touch, and/or sound, and optionally a spine for holding the cover and the plurality of pages. The book is designed so that the animal will sustain interest in the book and interact with the reader. In various embodiments, a page is provided, the page comprising at least one element that is attractive to the animal's sense of sight, smell, taste, touch, and/or sound.

18 Claims, 3 Drawing Sheets

U.S. PATENT DOCUMENTS

| | | | |
|---|---|---|---|
| 6,135,844 | A | 10/2000 | D'Andrea |
| 6,234,534 | B1 | 5/2001 | Warren |
| D452,524 | S | 12/2001 | Fernandes et al. |
| 6,450,819 | B1 | 9/2002 | Kaufman et al. |
| 6,652,897 | B1 * | 11/2003 | Stewart ............... 426/383 |
| 6,786,792 | B2 | 9/2004 | Ritchey |
| 6,838,101 | B2 | 1/2005 | Hoy |
| 2001/0013698 | A1 | 8/2001 | Soussan |
| 2003/0022590 | A1 | 1/2003 | Peters |
| 2005/0005873 | A1 | 1/2005 | Gick |
| 2005/0022751 | A1 | 2/2005 | Nelson |

OTHER PUBLICATIONS

Rosemary Wells, "McDuff's Favorite Things: Touch and Feel", Hyperion, May 1, 2004 (web page).

Katherine Howard, Little Bunny Follows His Nose (Golden Scratch & Sniff Books) Golden Books, Jan. 2004, (web page).

Jessica Medinger Nelson, "Struggling Readers' Best Friends; Therapy Dogs Listen, Bark and Don't Judge", The Washington Post, pp. 1-2, Nov. 25, 2004.

Kathy Klotz, "Reading to Dogs . . . a "Pawsitive Experience"", Parents' Choice Foundation, pp. 1-3, 2004.

Bethany McLean, "This just in—Think like a dog", Fortune, pp. 1-4, Oct. 4, 2004.

* cited by examiner

PAGE OR BOOK FOR INTERACTING WITH AN ANIMAL

BACKGROUND

Animal owners often seek ways to interact with their animals. It is not only enjoyable, but it also promotes the health and well-being of the animal and creates or enhances a bond or relationship between the animal and owner. Some animal owners will try to read books to their animals to help develop this bond. In fact, there are books published that are intended to be read to animals. However, these books are standard text-only printed books, and the animal does not maintain attention to the book while it is being read. A better bond or relationship between owner and animal could be enhanced if the animal maintained attention to the book while the book was being read.

There is one animal training book available that is packaged with a leash to be used to train the animal. However, this book is not intended to be read to the animal, and the leash serves merely as a gift for the purchaser. The leash is not intended to be used while the book is being read to the animal. It does not allow the animal to interact or become interested in the book.

Books for human babies and children are sold that have text and pictorial stories that can be read to the baby or child, while the baby or child (who may not be at reading age) maintains interest in the book because it contains attractive or interactive elements such as, for example, mirrors, or a variety of fabric textures. However, these books are clearly created and used for humans only—not to be read to animals. They are not attractive to animals, and will not sustain attention of animals.

Based on the above, there is a need for new ways to interact or sustain the attention of an animal (e.g., pet). Pages or books allowing the reader to interact or maintain the attention of an animal would provide a reader with a fun and new way to interact with the animal.

SUMMARY

The page or book of the present invention is designed with at least one element that is attractive to the animal (e.g., pet) so that the animal will sustain interest in the book and thus interact with the reader, showing or sharing the page or book with the animal. The page or book provides a new way for the reader to interact and/or play with the animal.

In various embodiments, a book for interacting with an animal is provided, comprising: a cover; a plurality of pages, at least two of the plurality of pages and/or cover having at least one element that is attractive to the animal; optionally a spine for holding the cover and the plurality of pages.

In various embodiments, a book for interacting with an animal is provided, comprising: a cover; a plurality of pages; at least two of the plurality of pages and/or cover having at least one element removably attached to the page and/or cover, each element is attractive to a different sense of the animal; and optionally a spine is provided for holding the plurality of pages and/or cover.

In various embodiments, a book for maintaining the attention of an animal is provided, comprising: a cover; a plurality of pages, at least one of the plurality of pages and/or cover having at least one element that is attractive to the animal; and optionally a spine is provided for holding the plurality of pages and/or cover.

In various embodiments, a method of maintaining attention of an animal is provided, comprising: reading a book to the animal, the book comprising a cover; a plurality of pages, at least two of the plurality of pages and/or cover having at least one element that is attractive to a different sense of the animal; and optionally a spine is provided for holding the plurality of pages and/or cover.

In various embodiments, a page for interacting with an animal is provided, the page comprising at least one element that is attractive to the animal.

Additional features and advantages of various embodiments will be set forth in part in the description that follows, and in part will be apparent from the description, or may be learned by practice of various embodiments. The objectives and other advantages of various embodiments will be realized and attained by means of the elements and combinations particularly pointed out in the description and appended claims.

It is to be understood that the figures are not drawn to scale. Further, the relation between objects in a figure may not be to scale, and may in fact have a reverse relationship as to size. The figures are intended to bring understanding and clarity to the structure of each object shown, and thus, some features may be exaggerated in order to illustrate a specific feature of a structure.

DETAILED DESCRIPTION

Reference will now be made in detail to certain embodiments of the invention, examples of which are illustrated in the accompanying drawings. While the invention will be described in conjunction with the illustrated embodiments, it will be understood that they are not intended to limit the invention to those embodiments. On the contrary, the invention is intended to cover all alternatives, modifications, and equivalents, which may be included within the invention as defined by the appended claims.

The page or book of the present invention offers a new way to interact and/or play with the animal that can be enjoyable or therapeutic for the animal, and also can be enjoyable or therapeutic for the reader. The page or book is particularly beneficial when the reader is a child. In the literature, it has been suggested that children benefit from reading to animals. This is because it helps the child maintain interest in reading and reduces the child's shyness. It has also been suggested in literature that animal owners of all ages often seek new ways to play with animals, and interact with their animals—as illustrated by the multibillion dollar pet toy industry. The page or book of the present invention provides this enjoyable new way to interact with an animal.

In various embodiments, a book is provided that includes a plurality of pages, and/or a cover, and optionally a spine for holding the pages and/or cover. In various embodiments, the book includes a plurality of pages, and/or a cover, without a spine. In various embodiments, the book can comprise at least two pages and a spine for holding the book together. In various embodiments, the book can include front and rear covers and a spine for holding the covers, and may be made with or without pages. The term "book" as used herein includes any combination of pages and/or cover or backing, such as magazines, brochures, pamphlets, catalogues, albums, manuals, memos, books, or any artifact having a combination of pages and/or a cover that can be manufactured by a process of, or including, binding.

In various embodiments, the book includes text and/or graphics (e.g., photos and/or illustrations). Such text and/or graphics can be printed and/or embossed, or otherwise transposed onto the pages and/or cover by methods known in the art. In various embodiments, the book comprises some pages that are blank. In various embodiments, the book is fiction, non-fiction, or contains text for health, training or care of the animal.

Figure 1:
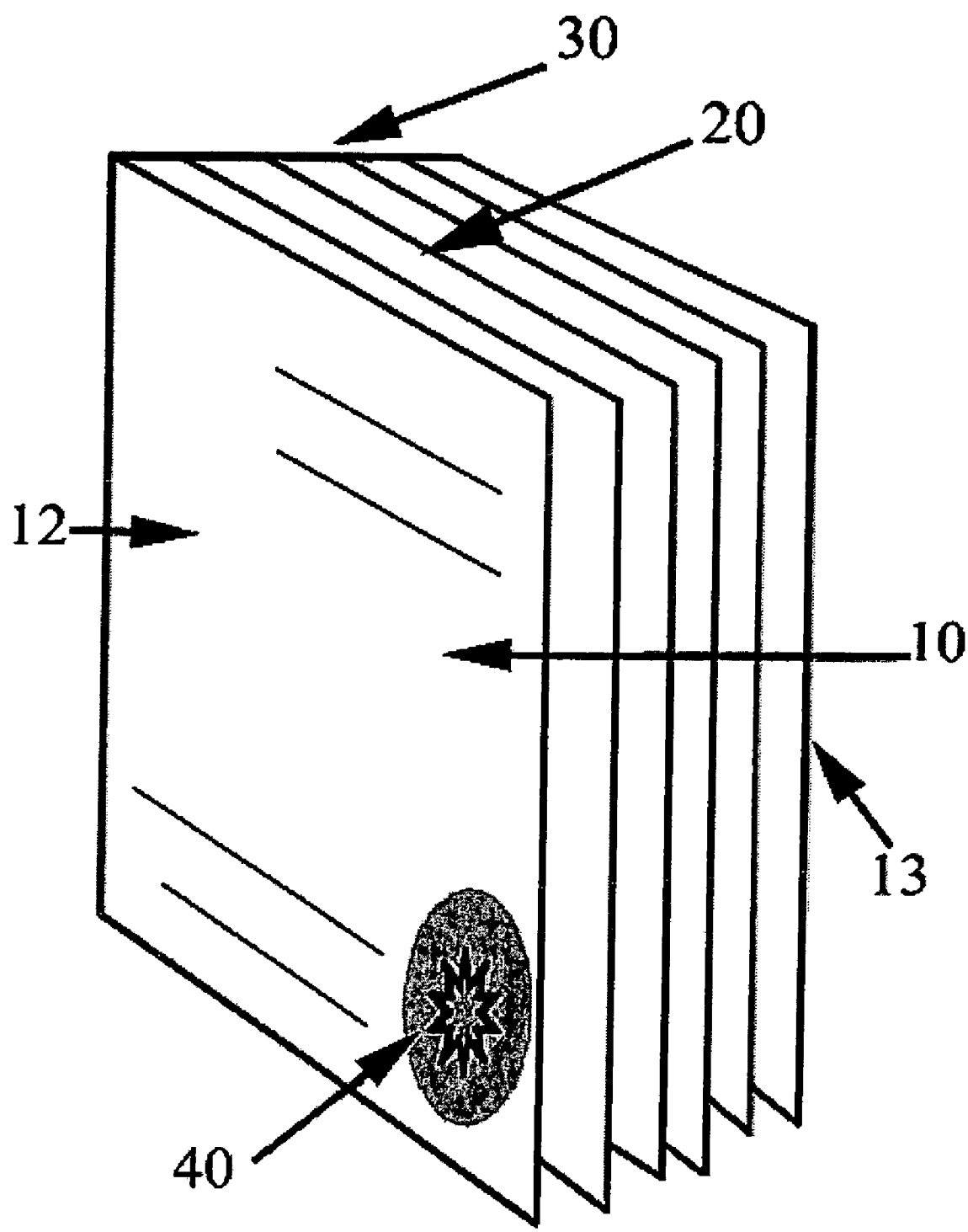
FIG. 1 illustrates one embodiment of the book having at least one attractive element attached to the cover of the book.

FIG. 1 is a side view of one embodiment of the book. The book includes cover 10 (front cover 12 and back cover 13) and pages 20 which are secured to each other at the spine 30. Attractive element 40, a squeaker, is attached to the cover of the book. The squeaker emits a sound that appeals to the animal's sense of hearing.

Figure 2:
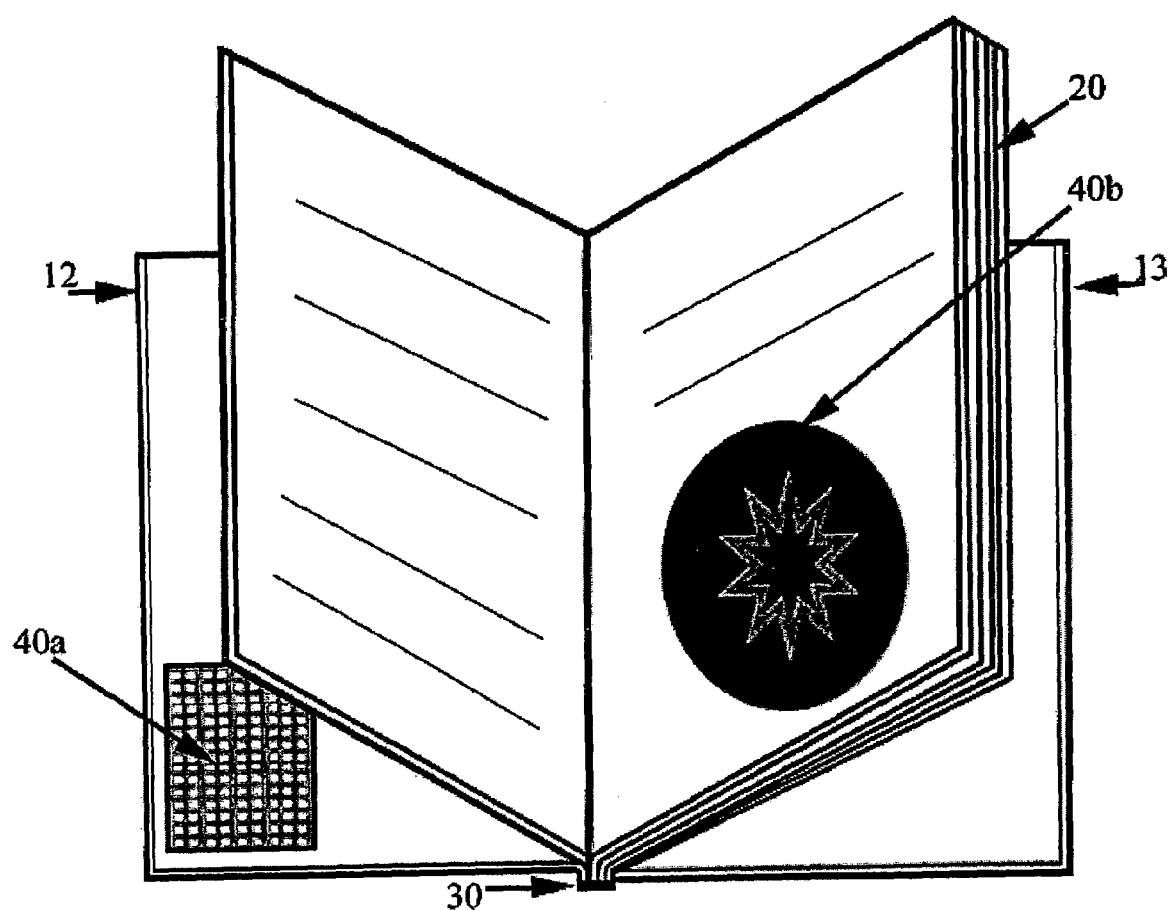
FIG. 2 illustrates one embodiment of the book in the open position having at least two attractive elements, one on one page of the book, while the second attractive element is attached to another page of the book.

FIG. 2 is a front view of one embodiment of the book in the open position. The book includes front cover 12 and back cover 13 and pages 20 which are secured to each other at the spine 30. Attractive element 40(a), scented paper or a scratch and sniff article, is attached to a page of the book and appeals to the animal's sense of smell. Attractive element 40(b), a squeaker, is shown attached to another page in the book and appeals to the animal's sense of hearing.

Figure 3:
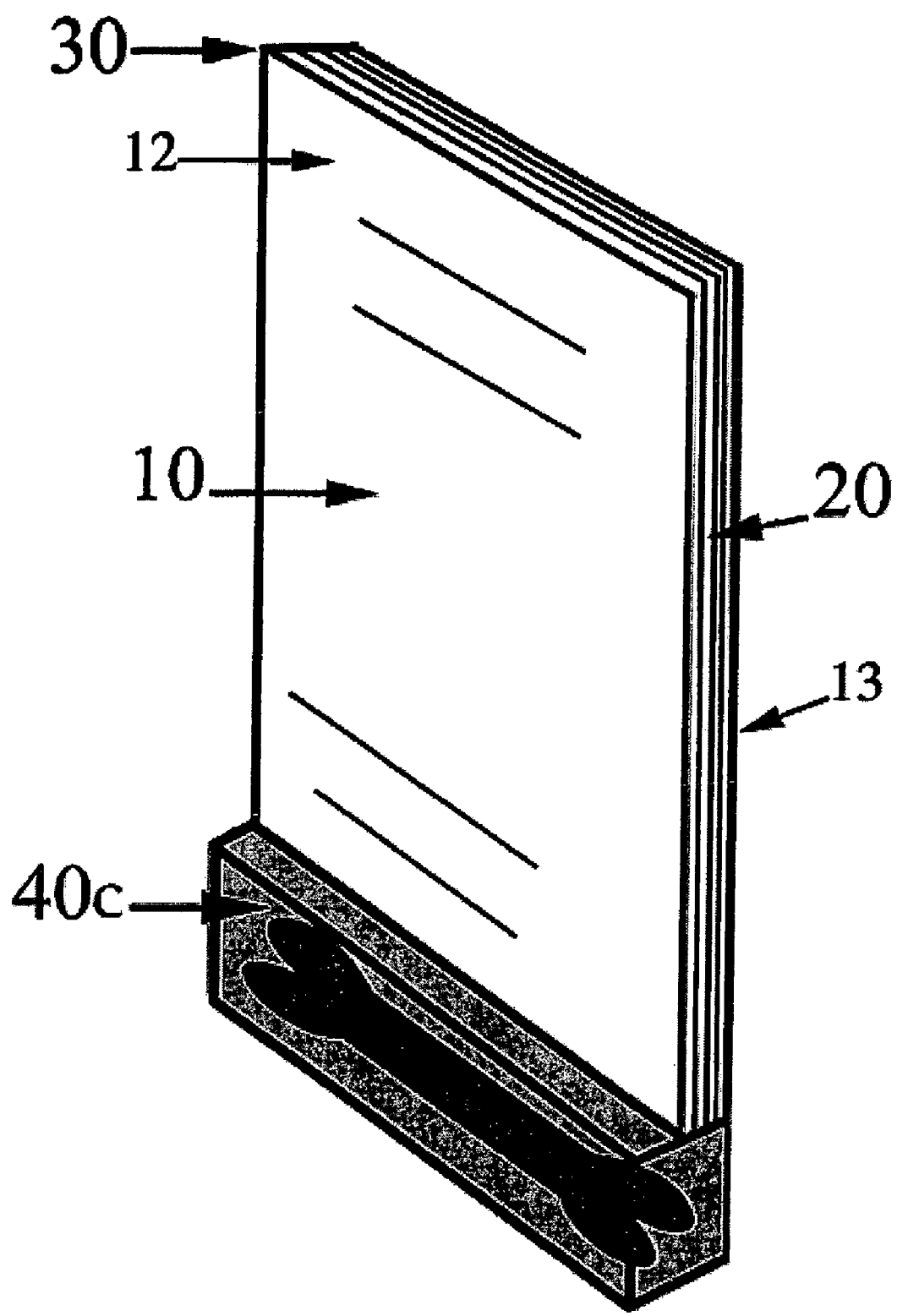
FIG. 3 illustrates one embodiment of the book in the closed position having a bone as the attractive element attached to the cover.

FIG. 3 is a partial side view of one embodiment of the book in the closed position. The book includes cover 10 (front cover 12 and back cover 13), and pages 20, which are secured to each other at the spine 30. Attractive element 40(c) is a bone that is enclosed in a container and is attached to the back cover. The bone appeals to the animal's sense of sight, taste, touch and smell. In various embodiments, the front cover and the pages are shorter than the back cover so that the front cover and pages close above the container. In various embodiments, the container is transparent so that the animal can see the bone when it is enclosed in the container.

The cover and/or pages of the book can have any length, width and thickness. For examples, pages can be about 0.10 mm-0.20 mm thickness, about 10 mm-790 mm width, and about 10 mm-550 mm length. Any length, width, and thickness of the pages and/or cover can be used in the book. The pages and/or cover of the book can be made of any material. For example, the pages and/or cover can be paper, cardboard, fabric, nylon, rubber, plastic, or combinations thereof. The book can be made into any desired color, size and shape. The book may have one or more covers only, one or more pages only, or a combination of one or more pages and one or more covers.

In various embodiments, the cover 10 will generally, but is not required, be a thickness greater than that of the pages 20. Cover 10 includes front cover 12, back cover 13 and spine 30. Spine 30 allows binding (e.g., glue, adhesive, thread, and/or staples, etc.) either reversibly or irreversibly to the cover and/or pages. Any method of attaching the pages and/or cover to the spine known in the art can be used to make the book.

In various embodiments, a ring type binder is used to hold the pages, cover, and/or attractive element. Ring-type binders include any binding mechanism where the pages, cover, and/or attractive element are held together by a loop of material. The loop may be permanently closed, such as through the use of a solid ring of metal or plastic, a fused strip of rubber, or a sewn strip of cloth. Alternatively, the loop may be non-permanently closed, such as through the use of tied strings, vinyl, a metal or plastic ring that may be opened and closed.

In various embodiments, a page for interacting with an animal is provided, the page comprising at least one element that is attractive to the animal. The page can be a single sheet (e.g., cardboard, paper, fabric, plastic, etc.) that includes text and/or graphics (e.g., photos and/or illustrations). Such text and/or graphics can be printed and/or embossed, or otherwise transposed onto the page by methods known in the art. In various embodiments, the page contains text that is fiction, non-fiction, or contains text for health, training or care of the animal.

The page or book comprises at least one attractive element, which can be anything that will attract or hold the interest of the animal and allow the reader to interact with the animal. For example, the attractive element will lure the animal to the page or book and maintain the attention of the animal. In various embodiments, the attractive element maintains the attention of the animal for at least one minute, more preferably, at least 5 minutes and most preferably for at least 15 minutes or longer. The reader now can play and have an enjoyable interaction with the animal.

Attractive elements appeal to one or more senses of the animal. Attractive elements appeal to the sight, sound, smell, taste, and/or touch of the animal. Examples of an attractive element include but are not limited to, a toy, such as for example, ball, rope pull toy, rubber chew toy, stuffed animal, figure, or the like, or combination thereof. The attractive element can be, but is not limited to, an animal food, such as for example, pet treat, a plant material (e.g., catnip), bone, seed, mineral, nutrient, biscuit, or the like, or a scent bearing article, such as for example, scratch and sniff, or scented paper, or the like, or auditory stimulus, such as for example, the reader's voice or voice tone, squeaker, clicker, bell, or recorded sound, or the like, or visually appealing element, such as for example, feather, string, foil, light, mirror, glitter, tinsel, or the like, or a combination thereof.

In various embodiments, the edible attractive element can be partially or completely edible. For example, the edible attractive element may be a chewy toy that is designed to be chewed, not eaten, but when chewed releases an edible treat for the animal that can be eaten. In various embodiments, the edible attractant can be animal food.

In various embodiments, the page or book comprises text that instructs the readers to say any of a set of commands for the animal to learn or do. These commands include, but are not limited to, sit, stay, down, come here, up, beg, rollover, give me your paw, give me a kiss, and the like. The reader's voice or voice tone will be the attractive element that allows the interaction with the animal.

In various embodiments, the page or book comprises text that instructs the readers to perform any of a set of behaviors for, to, or with the animal. These behaviors include, but are not limited to, "pet the animal," "give the animal a treat," "get a kiss from the animal" and the like. The reader's action of performing the behavior will be the attractive element that allows the interaction with the animal.

In various embodiments, attractive elements for dogs include at least one element that is attractive to the pet's sense of smell, sound, sight, touch and/or taste:

Smell: Scratch and sniff or scented paper containing the scent of beef, liver, bacon, chicken, turkey, lamb, cheese, hot dogs, peanut butter, gravy, dog food, or the like. Actual dog food, dog treat, dog biscuit, dog chews, bone, beef hide, raw hide, dried poultry, dried pig ears, or the like.

Sound: Squeaker, clicker, whistle, silent whistle, reader's voice, recorded human voice, recorded whistling, recorded squeaking, barking or the like.

Sight: Stuffed toy, plush toy, latex toy, rubber toy, leash, bone, ball, rope, or the like.

Touch: Rope, stuffed toy, plush toy, latex toy, brush, bone, ball, rubber toy or the like.

Taste: Dog food, dog treat, dog biscuit, dog chews, bone, beef hide, raw hide, dried chicken, dried turkey, dried pig ears, or the like.

In various embodiments, attractive elements for cats include at least one element that is attractive to the pet's sense of smell, sound, sight, touch and/or taste:

Smell: Scratch and sniff or scented paper containing the scent of fish, chicken, turkey, catnip, or the like. Actual cat food, cat treats, dried fish, dried poultry, catnip, or the like.

Sound: Squeaker, whistle, clicker, bell, crinkle paper, foil, reader's voice, recorded human voice, recorded whistling, recorded squeaking, meowing, chirping or the like.

Sight: Pop-up, hanging toy, feather, glitter, tinsel, foil, mylar, mirror, light, laser, stuffed toy, plush toy, latex toy, ball, string, bell, fur, or the like.

Touch: Feather, string, yarn, foil, tinsel, cardboard, scratchy paper, stuffed toy, plush toy, latex toy, brush, ball, bell, fur or the like.

Taste: Cat food, cat treats, dried fish, dried poultry, catnip, or the like.

In various embodiments, attractive elements for birds (e.g., parakeets, parrots, cockatiels, finches, canaries) include at least one element that is attractive to the pet's sense of smell, sound, sight, touch, and/or taste:

Smell: Scratch and sniff or scented paper containing the scent of grass, catnip, grain, wood, bird seed, vegetables, fruits, nuts, or the like. Actual bird seed, bird treat, nuts, cuttlebone, dried vegetables, dried fruits, or the like.

Sound: Squeaker, whistle, clicker, crinkle paper, foil, reader's voice, recorded human voice, recorded whistling, recorded squeaking, chirping, or the like.

Sight: Mirror, perch, swing, hanging toy, rotating toy, ring, bell, ball, ladder, or the like.

Touch: Mirror, perch, swing, ladder, ring, ball, bell, cuttlebone, or the like.

Taste: Bird seed, bird treat, nuts, cuttlebone, dried vegetables, dried fruits, grain, grass, or the like.

In various embodiments, attractive elements for small animals, (e.g., rodents rats, hamsters, gerbils, mice, guinea pigs, rabbits, or ferrets) include at least one element that is attractive to the pet's sense of smell, sound, sight, touch, and/or taste:

Smell: Scratch and sniff, or scented paper containing the scent of small animal food, nuts, dried yogurt, dried fruit, dried vegetable, alfalfa, hay, or the like. Actual small animal food, nuts, grains, seeds, dried yogurt, dried fruit, dried vegetable, alfalfa, hay, or the like.

Sound: Crinkle paper, rattle, squeaking, chirping, clicking, or the like.

Sight: Cardboard tube, other tube, ball, rotating toy, wheel, or the like.

Touch: Bedding material (such as cotton or tissue paper), scratchy paper, cardboard, wood, brush, rotating toy, wheel, tube, or the like.

Taste: Small animal food, nuts, grains, seeds, dried yogurt, dried fruit, dried vegetable, alfalfa, hay, or the like.

In various embodiments, the attractive element can be a squeaker, reader's voice, animal wearing apparel, scent bearing article, such as scented paper or sticker, scratch-and-sniff, plant material, treat, animal food, feather, fur, leash, rope, string, yarn, bone, rawhide, pop-up article, perch, tube, hole, laser, light, fastener, foil, crinkle paper, mirror, wood, rubber, wire, cloth, plastic, nylon, mechanical device (e.g., automatically dispenses a scent, or treats to the animal), sound emitting device, such as for example, bell, clicker, whistle, horn, squeaker, or combination thereof.

In various embodiments, the attractive element is a sound emitting device and comprises an electronic, mechanical, or digital recorder to record the reader or trainer's voice, or the sound from the animal, and a player to play it back to the animal. In various embodiments, a microphone or wireless communication system is provided for live reproduction of human voice or animal sounds. In various embodiments, the sound emitting device produces sounds to attract the animal, such as for example, human voice, barking, meowing, chirping, clicking, squeaking, whistling, water sounds, music, or the like or combination thereof.

In various embodiments, a page or book is provided comprising an element that is attractive to a different sense of the animal. For example, the book may contain at least two attractive elements for the animal, one on one page or front cover of the book and the second attractive element on another page or back cover of the book. Each of the attractive elements can appeal to a different sense of the animal. For example, one element can appeal to the animal's sense of smell, such as food or a treat or scented paper, while the other element can appeal to the animal's sense of sound, such as a squeaky toy.

In various embodiments, a page or book is provided where the attractive element can be attractive to more than one sense of the animal. For example, the attractive element can be a toy bone that produces an attractive squeaking sound. Thus, the toy bone is attractive to the animal's sense of sight and sound.

In various embodiments, the page or book comprises an attractive element that is a sound emitting device, at least one element that is an animal toy, at least one element that is a visual attractant and at least one element that stimulates the olfactory sense of the animal, each element removably attached to different pages and/or the cover by a fastener.

In various embodiments, the attractive element may permanently or removably be attached to the page, cover, and/or optionally the spine. Suitable fasteners to attach the attractive element to the page, spine and/or cover of the book include, but are not limited to, VELCRO®, string, rope, chain, staple, rubber band, buckle, belt, adhesive, pocket, clip, screw, nail, hook, tape, wrap, zipper or the like.

In various embodiments, the one or more attractive elements are packaged with the page, cover, and/or optionally the spine and sold as one unit. For example, an attractive element can be wrapped along with the page or book. When the page or book is sold, the owner can remove the wrapping and use the page or book and attractive element to interact with their animal.

In various embodiments, the page or book can have one or more attractive elements that allow the reader to interact with one or more pets of the same or different species. For example, the page or book can contain an attractive element for cats and a second attractive element for a dog. Thus, the reader can interact with a cat and dog simultaneously for double the fun.

In various embodiments, the page or book can have one, two, three, four, five, six, seven, eight, nine or ten or more attractive elements on one or more pages. Some of the pages may contain no attractive elements.

In various embodiments, the page, cover and/or spine of the book comprises one or more containers or receptacles or pockets for holding the attractive element(s). The container, receptacle or pocket can be attached to the page, cover, and/or spine. The container can have a lid to hold the attractive element(s).

The page or book provides a new way for the reader to interact and/or play with an animal (e.g., pets). Such animals are not human and include, but are not limited to, mammals, birds, fish, reptiles, amphibians, or arthropods (e.g. insects, spiders, etc.). Preferred animals include, but are not limited to, dogs, snakes, cats, rabbits, rodents (e.g., hamsters, gerbils, mice), guinea pigs, ferrets, turtles, lizards, fish, monkeys, horses, goats, cows, donkey, parrots, parakeets, and the like.

In various embodiments, a method of maintaining attention of an animal is provided comprising: reading the page or book to the animal and allowing the attractive element to lure the animal to the book so that the reader can, for example, play with, or maintain the attention of the animal.

It will be apparent to those skilled in the art that various modifications and variations can be made to various embodiments described herein without departing from the spirit or scope of the teachings herein. Thus, it is intended that various embodiments cover other modifications and variations of various embodiments within the scope of the present teachings.

What is claimed is:

1. A book for use by a pet owner for interacting with a pet, comprising:
   a cover with a front and back side, and a spine for connecting said cover and pages;
   a plurality of pages, and a plurality of interest elements selected to be of interest to a pet by appealing to at least three different senses, with
   at least one of the plurality of pages and/or cover and/or spine having at least one sound element which is a sound producing feature that produces a sound selected as a sound of interest to said pet;
   at least one of the plurality of pages and/or cover and/or spine having at least one taste element that is an edible unit for said pet and is configured for removal from said book for feeding to said pet; and
   at least one of the plurality of pages and/or cover having at least one visual element that is selected for visual interest to said pet; wherein
   said book is configured to have features of interest to a pet, and may be a point of interaction between said pet owner and said pet, and which may include text for said pet owner to read to said pet, with said interest elements being interspersed with said text.

2. A book according to claim 1, wherein the at least one sound element is selected from the group comprising a squeaker, clicker, bell, whistle, foil, crinkle paper, sound emitting device or combination thereof.

3. A book according to claim 1, wherein at least one of the plurality of pages and/or cover and/or spine comprises a container for holding the at least one interest element.

4. A book according to claim 1, wherein the at least one interest element is removably attached to the page, cover, and/or spine by a fastener.

5. A book according to claim 1, wherein the book comprises at least one element that is an edible animal unit, at least one element that is a sound emitting device, at least one element that is a animal toy, at least one element that is a visual attractant, and at least one element that stimulates the olfactory sense of the animal, each element removably attached to different pages by a fastener.

6. A book according to claim 1, wherein at least one of the plurality of pages and/or cover is edible by the animal.

7. The book of claim 1 which further comprises a fourth element which is a smell producing feature that is configured to produce a smell selected as a smell of interest to said pet.

8. The book of claim 1 in which said interest elements are selected for interest to a canine pet.

9. The book of claim 1 in which said interest elements are selected for interest to a feline pet.

10. A book according to claim 1, wherein the at least one taste element is selected from the group comprising; food, nutrient, plant material, animal material scratch-and-sniff patch, scented paper, bone, rawhide, or combination thereof.

11. A book according to claim 1, wherein the at least one visual element is selected from the group comprising; animal wearing apparel, feather, fur, leather, leash, brush, bone, rope, string, yarn, ball, pop-up article, perch, tube, laser, light, fastener, mirror, wood, rubber, foil, wire, glitter, tinsel, cloth, plastic, nylon or combination thereof which contains a visual element in the form of movement, light, shape, color, or other visual stimulation.

12. A method of maintaining attention of a pet by a pet owner, comprising:
   reading a book to the animal, the book comprising a cover with a front and back side, and a spine for connecting said cover and pages,
   a plurality of pages, and a plurality of interest elements selected to be of interest to a pet by appealing to at least three different senses, with
   at least one of the plurality of pages and/or cover and/or spine having at least one sound element comprising a sound producing feature that produces a sound selected as a sound of interest to said pet
   at least one of the plurality of pages and/or cover and/or spine having at least one taste element that is an edible unit for said pet and is configured for removal from said book for feeding to said pet; and
   at least one of the plurality of pages and/or cover having at least one visual element that is selected for visual interest to said pet; wherein
   said book is configured to have features of interest to a pet, and may be a point of interaction between said pet owner and said pet, and which may include text for said pet owner to read to said pet, with said interest elements being interspersed with said text.

13. A method according to claim 12, wherein the at least one sound element is selected from the group comprising squeaker, bell, whistle, clicker, sound emitting device or combination thereof.

14. A method according to claim 12, wherein at least one of the plurality of pages and/or cover comprises a container for holding the at least one interest element.

15. A method according to claim 12, wherein the at least one interest element is removably attached to the page, cover and/or spine by a fastener.

16. A method according to claim 12, wherein the at least one taste element is selected from the group comprising; food, nutrient, plant material, animal material, scratch-and-sniff patch, scented paper, bone, rawhide, or combination thereof.

17. A method according to claim 12, wherein the at least one visual element is selected from the group comprising; animal wearing apparel, feather, fur, leather, leash, brush, bone, rope, string, yarn, ball, pop-up article, perch, tube, laser, light, fastener, mirror, wood, rubber, foil, wire, glitter, tinsel, cloth, plastic, nylon or combination thereof.

18. A book for use by a pet owner for interacting with a pet, comprising:
- a cover with a front and back side, and a spine for connecting said cover and a pages;
- a plurality of pages, and a plurality of interest elements selected to be of interest to a pet by appealing to at least four different senses, with
- at least one of the plurality of pages, cover or spine having at least one sound element which is a sound producing feature that produces a sound selected as a sound of interest to said pet;
- at least one of the plurality of pages and/or cover having at least one visual element that is selected for visual interest to said pet;
- at least one of the plurality of pages, cover or spine having at least one smell element which is a smell producing feature that is configured to possess a smell selected as a smell of interest to said pet; and
- at least one of the plurality of pages and/or cover and/or spine having at least one taste elements that is an edible unit for said pet and is configured for removal from said book for feeding to said pet; wherein
- said book is configured to have features of interest to a pet, and may be a point of interaction between said pet owner and said pet, and which may include text for said pet owner to read to said pet, with said interest elements being interspersed with said text.

* * * * *